May 21, 1963  R. GOTTSCHALD ETAL  3,090,642
BALL AND SOCKET JOINTS
Filed Sept. 22, 1959

INVENTORS
Rudolf Gottschald,
and Gottfried Maxeiner,

By Diggins + LeBlanc

ATTORNEYS

3,090,642
BALL AND SOCKET JOINTS

Rudolf Gottschald, Osterrath, and Gottfried Maxeiner, Dusseldorf, Germany, assignors to Viktor Langen, Dusseldorf-Oberkassel, Germany
Filed Sept. 22, 1959, Ser. No. 841,534
Claims priority, application Germany Sept. 28, 1958
2 Claims. (Cl. 287—90)

This invention relates to a ball and socket joint in which a ball is mounted in the socket and has a pin which projects through an opening in the socket. In such a ball and socket joint it sometimes happens that the pin on the ball, when it is deflected, strikes against the edge of the opening in the socket and is thereby deformed. If the pin repeatedly strikes against the edge of the opening, grooves or indentations may be formed in the pin at approximately its weakest point and there is consequently a danger that the pin may break.

In ball and socket joints in which the bearings in which the ball is carried are made of elastic material, for example synthetic material, which surrounds a part of the neck of the pin in the form of a seal, this seal may be crushed or damaged when the pin strikes against the edge of the opening in the socket.

Figure 1:
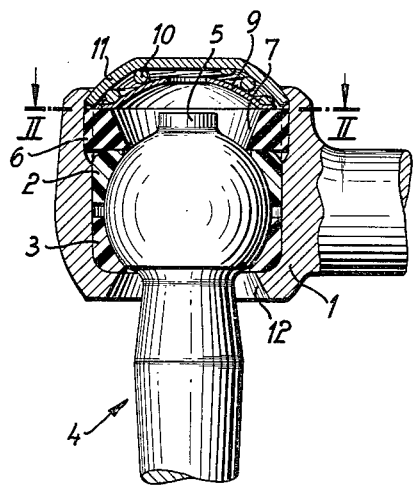
Figure 3:
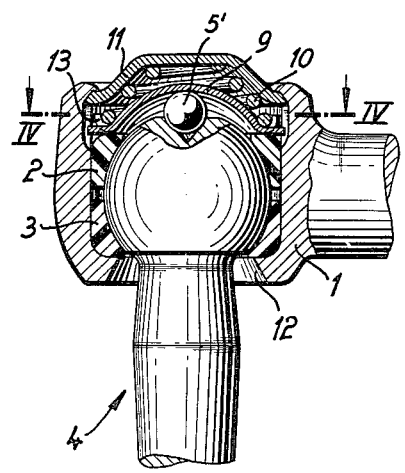
Figure 2:
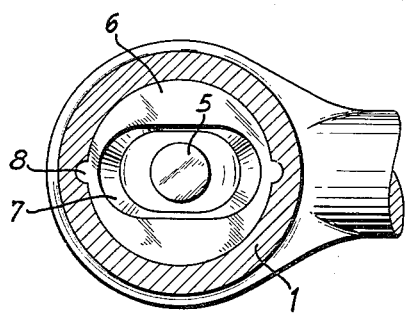
Figure 4:
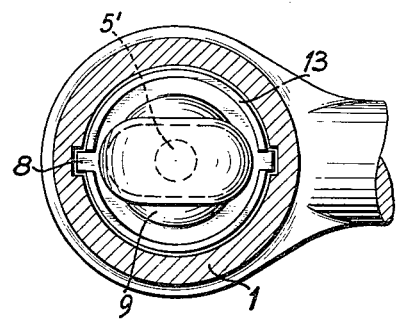

The object of the invention is to obviate the above disadvantages by limiting the deflection of the ball pin. In accordance with the invention there is provided on the side of the ball remote from the pin, a stop which limits the deflection of the ball pin. The stop can be constructed in various ways and some embodiments are illustrated, by way of example, in the accompanying drawing, in which:

FIGURES 1 and 2 show in vertical section and sectional plan respectively one embodiment of a ball and socket joint in accordance with the invention; and FIGURES 3 and 4 are similar views of another embodiment.

Referring to FIGURES 1 and 2 of the drawings, the ball and socket joint consists of a socket 1, and bearing members 2 and 3 for the ball from which a pin 4 projects through an opening in the socket. The ball is provided on the side remote from the pin 4 with an extension 5 which acts as a stop and projects into a surrounding ring 6 disposed in the socket. The ring 6 is made of rubber or similar elastic, yielding material in order to act as a shock-absorber when it is struck by the extension 5. The opening 7 in the ring 6 is non-circular and thus enables the pin 4 to make a greater deflection in one direction than in the other. The ring 6 is secured against rotation in the socket by means of a projection 8. The bearing members 2 and 3 are loaded by a spring 10, a spring plate 9 being interposed, and the socket 1 is closed by a cover 11.

FIGURES 3 and 4 show in similar views to FIGURE 1 different means for limiting the deflection of the ball pin. In this embodiment the extension which acts as a stop is formed by a ball 5' which engages in a bore or indentation in the ball. The radius of curvature of the arch of the spring plate 9 corresponds at the middle of the plate to the greatest distance of the ball 5' from the centre of the ball head of the pin 4. The radius of curvature, however, becomes smaller towards the edge of the spring plate 9. In other words, the radial distance from the center of the ball head to the bottom wall of the ends of the arcuate recess is smaller than the radial distance from the center of the ball head to the medial portion of the bottom wall of the arcuate recess and the distance between the edge of the semi-spherical shaped plate and the cover plate is less than the difference between the above-mentioned radii. By this construction and arrangement, when the pin 4 is deflected, the spring plate is pressed away by the ball 5' in the longitudinal direction of the pin until the outer edge 13 of the spring plate 9 bears against the cover 11. The deflection of the ball pin 4 is limited in this way. The spring 10 opposes the movement of the spring plate 9 so that the deflection of the pin is damped.

We claim:

1. A ball and socket joint comprising a socket, bearing members positioned within the socket, a ball head mounted within the bearing members, a pair of openings formed in said socket, a pin integral with said ball head projecting through one of the openings in the socket, projection means carried by the ball head on the side opposite from the pin, a cover plate closing the other opening in the socket, a semi-spherical shaped plate mounted within the socket, an arcuate recess extending across said semi-spherical shaped plate a distance substantially equal to the diameter of the ball head, said projection means being positioned within the recess, a spring mounted between the cover plate and the spherical-shaped plate for biasing said plate against the projection means, the radial distance from the center of the ball head to the bottom wall of the ends of the arcuate recess being smaller than the radial distance from the center of the ball head to the medial portion of the bottom wall of the arcuate recess, the distance between the edge of the semi-spherical shaped plate and the cover plate being less than the difference between the radial distance from the center of the ball head to the bottom wall of the ends of the arcuate recess and the radial distance from the center of the ball head to the medial portion of the bottom wall of the arcuate recess, whereby upon deflection of the pin, the spherical plate is pressed away by the projection means in the longitudinal direction of the pin until the edge of the spherical plate bears against the cover plate to thereby limit the deflection of the pin.

2. A ball and socket joint according to claim 1, wherein the projection means comprises an indentation formed on the side of the ball head opposite from the pin, and a ball member positioned in said indentation.

References Cited in the file of this patent
UNITED STATES PATENTS 2,754,141    Latzen _____ July 10, 1956

FOREIGN PATENTS 666,989    France _____ June 3, 1929
760,000    France _____ Dec. 6, 1933
852,022    Germany _____ Oct. 9, 1952